United States Patent
Chang et al.

US 6,764,752 B2
Jul. 20, 2004

(54) BIAXIALLY ORIENTED POLYPROPYLENE METALLIZED FILM FOR PACKAGING

(75) Inventors: Keunsuk P. Chang, North Kingstown, RI (US); Mark S. Lee, North Kingstown, RI (US); Leo R. Moreau, Cumberland, RI (US)

(73) Assignee: Toray Plastics (America), Inc., N. Kingstown, RI (US)

( * ) Notice: Subject to any disclaimer, the term of this patent is extended or adjusted under 35 U.S.C. 154(b) by 383 days.

(21) Appl. No.: 09/820,782

(22) Filed: Mar. 30, 2001

(65) Prior Publication Data

US 2002/0172815 A1 Nov. 21, 2002

Related U.S. Application Data

(60) Provisional application No. 60/221,510, filed on Jul. 28, 2000, and provisional application No. 60/218,044, filed on Jul. 13, 2000.

(51) Int. Cl.[7] .......................... B32B 15/08; B32B 27/00
(52) U.S. Cl. ...................... 428/215; 428/220; 428/336; 428/349; 428/457; 428/461; 428/467; 428/910
(58) Field of Search ................................. 428/461, 220, 428/336, 331, 516, 457, 467, 910, 215, 349

(56) References Cited

U.S. PATENT DOCUMENTS

| 4,394,235 A | | 7/1983 | Brandt et al. ................ 204/165 |
|---|---|---|---|
| 4,397,916 A | | 8/1983 | Nagano ........................ 428/461 |
| 4,590,125 A | | 5/1986 | Balloni et al. ............... 428/349 |
| 4,870,122 A | | 9/1989 | Lu ............................... 524/488 |
| 5,194,318 A | * | 3/1993 | Migliorini et al. ........... 428/215 |
| 5,527,608 A | * | 6/1996 | Kemp-Patchett et al. ... 428/349 |
| 5,698,317 A | | 12/1997 | Kurokawa et al. .......... 428/349 |
| 5,717,048 A | | 2/1998 | Tsubaki et al. .............. 526/287 |
| 5,859,141 A | | 1/1999 | Tsubaki et al. .............. 526/218 |
| 6,033,514 A | * | 3/2000 | Davis et al. ............ 156/244.11 |
| 6,194,061 B1 | | 2/2001 | Satoh et al. ................. 428/341 |

OTHER PUBLICATIONS

PCT International Search Report, PCT/US01/22079, Nov. 1, 2001.

* cited by examiner

*Primary Examiner*—Monique R. Jackson
(74) *Attorney, Agent, or Firm*—Morrison & Foerster LLP

(57) ABSTRACT

A laminate film comprising a polymer core layer; a resin layer disposed on a surface of the polymer layer; and a metal layer deposited on a surface of said resin layer; wherein the laminate film has excellent adhesion between the resin layer and the metal layer and barrier durability is disclosed.

25 Claims, 1 Drawing Sheet

BIAXIALLY ORIENTED POLYPROPYLENE METALLIZED FILM FOR PACKAGING

RELATED APPLICATIONS

This application claims priority from Provisional Application Serial Nos. 60/218,044 filed Jul. 13, 2000, and 60/221,510, filed Jul. 28, 2000, both entitled "Biaxially Oriented Polypropylene Metallized Film for Packaging," the entire disclosures of which are hereby incorporated herein by reference. This application is related to Ser. No. 09/715,013 filed Nov. 20, 2000, also entitled "Biaxially Oriented Polypropylene Metallized Film for Packaging," the entire disclosure of which is hereby incorporated herein by reference.

FIELD OF INVENTION

This invention relates to a metallized polypropylene film containing a metal adhesion layer comprising a polymer wax and a polyolefin resin. In particular, a polyethylene wax is blended with a polypropylene resin.

BACKGROUND OF INVENTION

Biaxially oriented polypropylene metallized films are used for many packaging applications, particularly in food packaging, because they have important sealing and protective qualities. The films minimize the amount of light, moisture, and oxygen which can normally enter an ordinary, unprotected package. The films are often used in food packaging in combination with gas-flushing applications to protect the contents from moisture and oxidation. Also, the films often provide a heat sealable inner layer for bag forming and sealing.

Metallized films used in vertical-form-fill-seal (VFFS) packaging provides an excellent barrier in both unlaminated or laminated forms. However, because of the wide variety of forming collars used, bag sizes, filling speeds, and machine tensions used during the process of bag-forming, the laminated packaging containing the metallized film can be stretched in the packaging machine from 5 to 10% beyond the dimensions of the original film packaging. This stretching may cause fracture or cracks to form in the metal layer of the film. As a result, the packaging loses its protective properties. For instance, oxygen can readily pass through a damaged packaging film and cause unwanted oxidation of the contents.

U.S. Pat. No. 5,698,317, which is incorporated herein by reference, discloses the use of a four layer packaging film having a polyolefin resin layer sandwiched between a polyolefin resin layer comprising a petroleum or terpene resin and a heat sealable layer or non-sealable winding layer. A metal layer is then deposited on the surface of the polyolefin resin layer. The metal layer is deposited following the discharge treatment of the polyolefin resin layer.

The present invention improves upon the moisture and gas barrier properties as well as the durability of the metal layer.

SUMMARY OF THE INVENTION

The invention helps solve the problem of leaky bags associated with conventional metallized film packaging and the bag-forming process by providing an improved polyolefin resin layer. The improved resin layer comprises a polymer resin with a polymer additive to form a resin layer. The addition of the polymer additive to the polymer resin enhances the adhesion between the blended polymer resin layer and the metal layer, and thus improves upon the durability of the packaging film during the bag forming process. The invention provides a metallized, laminate film which exhibits little or no fracture or cracking during the bag-forming process. The enhanced adhesive properties of the invention also improves upon the moisture and gas barrier properties of laminate film.

One embodiment of this invention is a laminate film comprising a polymer core layer; a resin layer disposed on a surface of said polymer layer; and a metal layer deposited on a surface of said resin layer; wherein the laminate film has metal adhesion of 2 or more; and wherein the laminate film has $O_2TR$ of 100 $cc/m^2/day$ or less at 38° C. and 0% relative humidity as measured on a 15 $\mu$m laminate film elongated 9% in the machine direction.

Another embodiment is a laminate film comprising a polymer core layer; a resin layer disposed on a surface of said polymer layer; a metal layer deposited on a surface of said resin layer; and means for enhancing adhesion between the resin layer and the metal layer. The means for enhancing adhesion could be an additive, which is polymeric or non-polymeric, organic or inorganic.

Another embodiment of this invention is a method of manufacturing a laminate film, comprising extruding a polymer core layer; extruding a resin layer disposed on a surface of said polymer layer; and depositing a metal layer on a surface of said resin layer; the laminate film having metal adhesion of 2 or more; and the laminate film having $O_2TR$ of 100 $cc/m^2/day$ or less at 38° C. and 0% relative humidity as measured on a 15 $\mu$m laminate film elongated 9% in the machine direction.

One embodiment of this invention is a method for food packaging, comprising obtaining a laminate film and covering food with the laminate film; the laminate film comprising a polymer core layer; a resin layer disposed on a surface of said polymer layer; and a metal layer deposited on a surface of said resin layer; wherein the laminate film has metal adhesion of 2 or more; and wherein the laminate film has $O_2TR$ of 100 $cc/m^2/day$ or less at 38° C. and 0% relative humidity as measured on a 15 $\mu$m laminate film elongated 9% in the machine direction.

The invention is of a laminate film comprising: a polyolefin resin layer; a polymer core layer; a heat sealable layer or non-sealable winding layer formed on the surface of a polymer core layer opposite the polyolefin resin layer; and a metal layer disposed on the polyolefin resin layer. The polymer core layer is sandwiched between the resin layer and the heat sealable layer. The invention contains a polyolefin resin layer having about 1 to 30 percent by weight, preferably 1 to 20 percent by weight, more preferably 1 to 10 percent by weight of a polymer additive. The polymer additive is selected from a group of synthetic polymer waxes. In the preferred embodiment a polyethylene crystalline wax is added to a polypropylene resin. The polyolefin resin layer may optionally contain up to 1000 ppm of antiblock additives such as silicas, aluminosilicates, or metal-aluminosilicates. The heat sealable layer or non-sealable winding layer may also contain antiblock components such as silicas, aluminosilicates, or polymeric antiblocks such as crosslinked silicone polymer in the amount of 0.10–0.50% by weight of the heat sealable or non-sealable winding layer. It is also preferred that the surface of the polyolefin resin layer be corona discharged treated to give excellent printability and promote adhesion between the resin layer and the metal layer. The metal layer is preferably a vapor deposited metal, preferably vapor deposited aluminum.

DETAILED DESCRIPTION OF THE INVENTION

Figure 1:
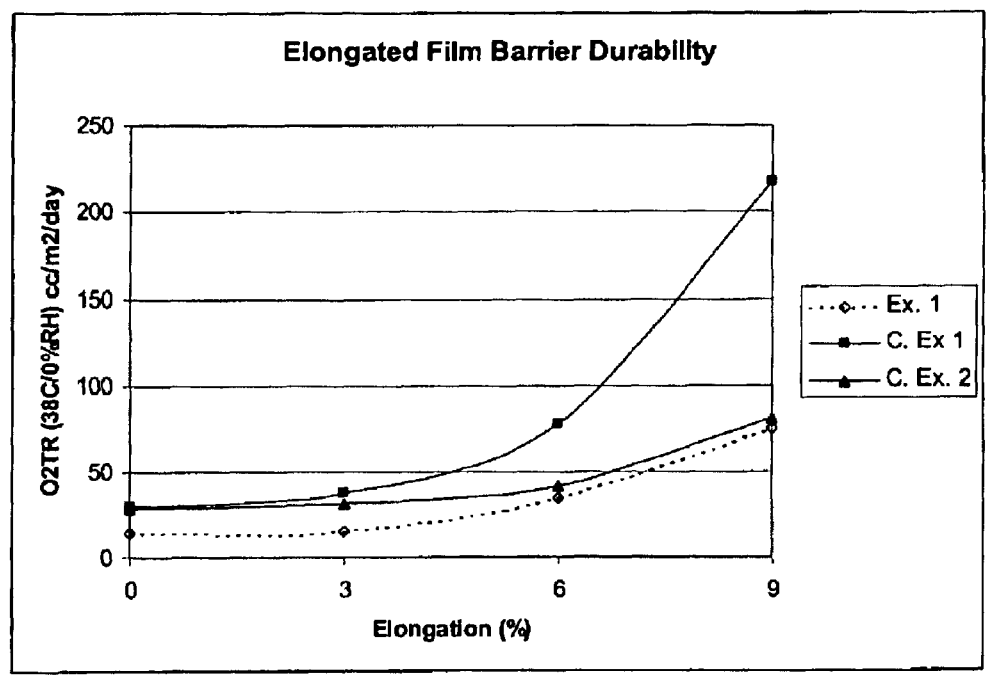
FIG. 1 shows barrier durability properties in terms of oxygen transmission rate as a function of elongation percentage.

In one embodiment, the laminate film comprises four layers. A polymer core, preferably a polypropylene core, is sandwiched between a polyolefin resin layer with at least one component selected from the family of synthetic polymer waxes, preferably a crystalline, polyethylene wax, and a heat sealable surface or a winding surface. Preferably, the heat sealable layer will contain an antiblock and/or slip additives for good machinability and a low coefficient of friction. The resin layer is then discharge treated. Al metal is then vapor-deposited upon the discharge treated resin layer. Additionally, if the heat sealable layer is used as a winding surface, its surface may also be discharge treated to make it suitable for laminating or converter applied adhesives and inks.

In one embodiment, the laminate film of the invention comprises the following material components, and is made according to the following procedure. A propylene polymer resin and a polyethylene wax having a molecular weight of about 3000, a viscosity of about 110 cp at 149° C., and a melting point of about 129° C. are blended together. In the preferred embodiment, a crystalline, propylene polymer resin is blended with a crystalline, linear, polyethylene wax. Optionally, a relatively small amount (about 100–1000 ppm) of an antiblock additive, preferably sodium calcium aluminosilicate powder having a mean particle diameter of about 3 µm is added to the polymer blend. The mixture is then extruded to form a polyolefin resin layer with a thickness of 0.75 µm.

The polyolefin resin layer is coextruded with a polymer core layer, preferably a polypropylene core layer, having a thickness between 5 and 36 µm, preferably between 10 and 20 µm, and more preferably between 10 and 15 µm, and a heat sealable layer opposite the resin layer having a thickness between 0.5 and 5 µm, preferably between 0.6 and 3.0 µm, and more preferably between 0.8 and 2.0 µm. The coextrusion process includes a three-layer composite die. The polymer core layer is sandwiched between the polyolefin resin layer and the heat sealable layer. The three layer laminate sheet is cast onto a cooling drum whose surface temperature is controlled between 20° C. and 60° C. to solidify the non-oriented laminate sheet.

The non-oriented laminate sheet is stretched in the longitudinal direction at about 135 to 165° C. at a stretching ratio of about 4 to about 5 times the original length and the resulting stretch sheet is cooled to about 15° C. to 50° C. to obtain a uniaxially oriented laminate sheet. The uniaxially oriented laminate sheet is introduced into a tenter and preliminarily heated between 130° C. and 180° C., and stretched in the transverse direction at a stretching ratio of about 7 to about 12 times the original length and then heat set to give a biaxially orientated sheet. The biaxially oriented film has a total thickness between 6 and 40 µm, preferably between 10 and 20 µm, and most preferably between 12 and 18 µm. The surface of the polyolefin resin layer of the biaxially oriented laminate film is subjected to corona discharge treatment in an atmosphere of $CO_2$, $N_2$ or a mixture thereof and the resulting sheet is wounded in a roll. The roll is placed in a metallizing chamber and aluminum was vapor-deposited on the discharge-treated polyolefin resin layer surface. The metal film may comprise any first row transition metal, aluminum, gold, or palladium, the preferred being aluminum. The metallized film is then tested for oxygen and moisture permeability, optical density, metal adhesion, and barrier durability.

The polyolefin resin layer will consist of polypropylene resin with an optional amount of an additive material. In one embodiment, the additive material is a synthetic crystalline linear polyethylene wax, having a molecular weight of 400–3000, a melting point of 80–132° C. by ASTM D127, a viscosity of 149° C. of 2–170 cp by ASTM D3236 or a viscosity at 99° C. of 40–60 SSU by ASTM D88, needle penetration at 25° C. of 15–0.0 dmm by ASTM D1321, and density at 25° C. of 0.92–0.99 by ASTM D1298. In another embodiment, the additive material consists of a synthetic branched ethylene copolymer wax, having a molecular weight of 500–3000, a melting point of 90–120° C. by ASTM D127, a viscosity at 99° C. of 58–120 SSU by ASTM D 88, needle penetration at 25° C. of 13.0–2.0 dmm by ASTM 1321, and average branches per molecule of 0.5–4.0. In another embodiment, the additive material consists of a synthetic hydroxyl-terminated polyethylene wax, having a molecular weight of 375–700, a melting point of 78–105° C. by ASTM D127, a viscosity at 149° C. of 2.0–10.0 cp by ASTM D3236, needle penetration at 25° C. of 10.0–1.5 dmm by ASTM 1321, density at 25° C. of 0.95–0.96 by ASTM D792, and hydroxyl number of 127–65 mg KOH/g by ASTM D222. In another embodiment, the additive material is a synthetic carboxyl-terminated polyethylene wax, having a molecular weight of 390–715, a melting point of 89–110° C. by ASTM D127, a viscosity at 149° C. of 5.0–17.0 cp by ASTM D3236, needle penetration at 25° C. of 9–1.5 dmm by ASTM 1321, and acid number of 115–63 mg KOH/g by BWM 3.01A.

If the invention comprises a heat sealable layer, this layer will comprise a ternary ethylene-propylene-butene copolymer. If the invention comprises a non-heat-sealable layer winding layer, this layer will comprise a crystalline polypropylene or a matte layer of a block copolymer blend of polypropylene and one or more other polymers whose surface is roughened during the film formation step so as to matte the winding layer. Preferably, in the case of a non-heat-sealable layer winding layer, the surface of the winding layer is discharge-treated to provide a functional surface for lamination or coating with adhesives and/or inks. The discharge treatment of said polyolefin-based resin layer is typically performed in an atmosphere of $CO_2$ and/or $N_2$.

The laminate film of the invention will have a thickness of about 6 to 40 µm thick. The polyolefin resin layer will have a thickness of about 0.2 to 5.0 µm. The heat-sealable layer or non-heat-sealable winding layer will have a thickness of 0.5 to 5.0 µm, and contains an anti-blocking agent of about 0.05–0.5% by weight of the heat-sealable layer. The vapor deposited metal layer, preferably an aluminum layer, formed on the discharge-treated surface of the polyolefin-based resin layer has a thickness of 5 to 70 nm.

Test Methods

The various properties in the Examples and Comparative Example that follow were measured by the following methods:

A) "Oxygen transmission rate ($O_2$TR)" of the film was measured by using a Mocon Oxtran 2/20 unit substantially in accordance with ASTM D3985. In general, the preferred value was an average value equal to or less than 15.5 $cc/m^2/day$ with a maximum of 46.5 $cc/m^2/day$.

B) "Moisture transmission rate" of the film was measured by using a Mocon Permatran 3/31 unit measured substantially in accordance with ASTM F1249. In general, the preferred value was an average value equal to or less than 0.155 g/m²/day with a maximum of 0.69 g/m²/day.

C) "Optical density" was measured using a Tobias Associates model TBX transmission densitometer. Optical density is defined as the amount of light reflected from the test specimen under specific conditions. Optical density is reported in terms of a logarithmic conversion. For example, a density of 0.00 indicates that 100% of the light falling on the sample is being reflected. A density of 1.00 indicates that 10% of the light is being reflected; 2.00 is equivalent to 1%, etc.

D) "Metal adhesion" was measured by adhering a strip of 1-inch wide 610 tape to the metallized surface of a single sheet of metallized film and removing the tape from the metallized surface. The amount of metal removed was rated qualitatively as follows:

4.0=0–5% metal removed
3.5=6–10% metal removed
3.0=11–20% metal removed
2.5=21–30% metal removed
2.0=31–50% metal removed
1.5=51–75% metal removed
1.0=76–100% metal removed In general, preferred values ranged from 3.0–4.0.

E) "Barrier durability" of the film was measured by elongating test specimens in the machine direction, i.e., the extrusion direction of the film, of the specimens in an Instron Tensile tester at 9% elongation. The elongated sample was then measured for barrier properties using Mocon Oxtran 2/20 or Permatran 3/31 units. In general, preferred values of $O_2TR$ (oxygen transmission rate), which is a measurement of the permeation rate of oxygen through a substrate, would be equal or less than 100, more preferably, less than 46.5 cc/m²/day up to 9% elongation and MVTR (moisture vapor transmission rate), which is a measurement of the permeation rate of water vapor through a substrate, would be equal or less than 0.69 g/m²/day up to 9% elongation. Intermediate values of barrier durability could also be obtained at intermediate values of elongation between 0 and 9% as shown in FIG. 1.

F) Surface chemistry of the discharge-treated surface was measured using ESCA surface analysis techniques. A Physical Electronics model 5700LSci X-ray photoelectron/ESCA spectrometer was used to quantify the elements present on the sample surface. Analytical conditions used a monochromatic aluminum x-ray source with a source power of 350 watts, an exit angle of 50°, analysis region of 2.0 mm×0.8 mm, a charge correction of C—(C,H) in C 1 s spectra at 284.6 eV, and charge neutralization with electron flood gun. Quantitative elements such as O, C, N were reported in atom %.

G) Depth profiling and composition of the metal layer was measured using ESCA surface analysis techniques. A Physical Electronics model 5700LSci X-ray photoelectron/ESCA spectrophotometer was used to high resolution depth profiles of O, C, and Al using a 3 kV Ar⁺ beam. Analytical conditions used a monochromatic aluminum x-ray source with a source power of 350 watts, a take-off angle of 65°, analysis region of 0.8 mm diameter, a charge correction of C—(C,H) in C 1 s spectra at 284.6 eV, charge neutralization with electron flood gun, ion sputtering of 3 kV Ar⁺, and $SiO_2$ sputter rate of 48 Å/min for $SiO_2$.

This invention will be better understood with reference to the following examples, which are intended to illustrate specific embodiments within the overall scope of the invention.

EXAMPLE 1

One hundred parts by weight of a crystalline propylene homopolymer resin; 5 parts by weight of a crystalline linear polyethylene wax having a molecular weight of 3000, a viscosity of 110 cp at 149° C., and a melting point of 129° C.; and 0.00015 parts by weight of a sodium calcium aluminosilicate powder having a mean particle diameter of 3 μm, were blended together. The mixture was then extruded to form a polyolefin resin layer with a thickness 0.75 μm. The polyolefin resin layer is coextruded with a propylene homopolymer core layer having a thickness 13.25 μm, and a heat sealable layer opposite the resin layer having a thickness 1.0 μm. The three layer film is coextruded so as to from a biaxially oriented film with a total thickness of 15 μm. The film was then discharge-treated on the polyolefin resin layer side (the metallizing surface) and wound in roll form. The roll was then placed in a metallizing chamber and aluminum was vapor-deposited on the discharge-treated polyolefin resin layer surface. The metallized film was then tested for oxygen and moisture permeability, optical density, metal adhesion, and barrier durability.

EXAMPLE 2

A process similar to that of Example 1 was repeated except that 10 parts by weight of the crystalline linear polyethylene wax of molecular weight was used.

EXAMPLE 3

A process similar to that of Example 1 was repeated except that a branched, ethylene, copolymer wax of having a molecular weight of 1200, a viscosity of 88 SSU at 99° C., and a melting point of 112° C. was substituted for the linear polyethylene wax.

COMPARATIVE EXAMPLE 1

A process similar to that of Example 1 was repeated except that no crystalline linear polyethylene wax was used in the polyolefin resin layer.

COMPARATIVE EXAMPLE 2

A process similar to that of Example 1 was repeated except that 12.5% by weight of a polydicyclopentadiene petroleum resin was used in place of the crystalline linear polyethylene wax in the polyolefin resin layer. In addition, the overall total thickness of the oriented film was increased to 17.5 μm instead of 15 μm by increasing the accompanying coextruded propylene homopolymer core layer to 15.25 μm and the heat sealable layer to 1.5 μm. The polyolefin resin layer thickness remained at 0.75 μm.

The results of the foregoing examples ("Ex.") and comparative example ("CEx.") are shown in Table 1 and FIG. 1. Table 1 shows that the metal adhesion of the laminate films of Examples 1–3 is considerably superior to that of Comparative Examples 1 and 2. FIG. 1 shows that the barrier durability as measured by $O_2TR$ of the laminate film of Example 1 is far better than that of Comparative Example 1. FIG. 1 also shows that the barrier durability of the laminate film of Example 1 having a film thickness of 15 μm is better than or comparable to the laminate film of Comparative Example 2 having a film thickness of 17.5 μm. As a general rule, the $O_2TR$ value is inversely proportional to the square of the thickness. Therefore, by increasing the laminate thickness from 15 to 17.5 μm, one would expect a decrease in the $O_2TR$ value of 1, for example, to $(15/17.5)^2=0.73$. Instead, FIG. 1 shows that the $O_2TR$ values for elongations from 0 to 9% of the laminate film of Comparative Example 1 is more than that of the laminate film of Example 1.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. The entire disclosure of the patents and publications referred in this application are hereby incorporated herein by reference.

TABLE 1

| Sample | Gauge | O2TR (23C/ 0% RH) cc/m2/day | MVTR (38C/ 100% RH) cc/m2/day | Optical Density | Metal Adhesion (1 = poor, 4 = best) |
|---|---|---|---|---|---|
| Example 1 | 60 | 14.26 | 0.093 | 2.36 | 3.0 |
| Example 2 | 60 | 16.10 | 0.124 | 2.38 | 3.0 |
| Example 3 | 60 | 16.05 | 0.175 | 2.44 | 3.0 |
| C. Example 1 | 60 | 26.82 | 0.279 | 2.40 | 1.5 |
| C. Example 2 | 70 | 28.36 | 0.139 | 2.56 | 1.5 |

What is claimed is:

1. A laminate film comprising:
   a polymer core layer;
   a resin layer comprising polypropylene disposed on a surface of said polymer layer; and
   a metal layer deposited on a surface of said resin layer;
   wherein the laminate film has metal adhesion of 2 or more;
   wherein the resin layer comprises an additive that enhances adhesion between the resin layer and the metal layer selected from the group consisting of a crystalline polyethylene wax, a branched ethylene copolymer wax, a hydroxyl-terminated polyethylene wax and a carboxyl-terminated polyethylene wax; and
   wherein the laminate film has $O_2TR$ of 100 cc/m$^2$/day or less at 38° C. and 0% relative humidity as measured on a 15 μm laminate film elongated 9% in the machine direction.

2. The laminate film of claim 1, wherein the polymer core layer comprises polyolefin.

3. The laminate film of claim 2, wherein the laminate film has a thickness of about 6 to 40 μm.

4. The laminate film of claim 1, wherein said resin layer has a thickness of about 0.2 to 5.0 μm.

5. The laminate film of claim 1, wherein said additive is about 1 to 15 percent by weight of said resin layer.

6. The laminate film of claim 1, wherein said resin layer further comprises about 10 to 10,000 ppm of an antiblock additive.

7. The laminate film of claim 6, wherein said antiblock additive is selected from the group consisting of silicas, aluminosilicates, and metal aluminosilicates.

8. The laminate film of claim 1, further comprising a heat sealable layer or a non-sealable, winding layer disposed on an opposite surface of said polymer core layer.

9. The laminate film of claim 8, wherein said heat sealable layer or non-sealable, winding layer comprises an antiblock additive.

10. The laminate film of claim 9, wherein said antiblock additive comprises silicas, aluminosilicates, or polymeric antiblocks such as crosslinked silicone polymer.

11. The laminate film of claim 9, wherein said antiblock additive comprises about 0.05 to 0.50 percent by weight of the heat sealable or non-sealable, winding layer.

12. The laminate film of claim 8, wherein said heat-sealable layer or non-heat-sealable, winding layer has a thickness of about 0.5–5.0 μm.

13. The laminate film of claim 8, wherein said heat-sealable layer comprises a ternary ethylene-propylene-butene copolymer.

14. The laminate film of claim 8, wherein said non-sealable, winding layer comprises crystalline polypropylene whose surface is roughened so as to produce a matte surface.

15. The laminate film of claim 8, wherein said non-sealable, winding layer comprises a block copolymer blend of polypropylene and one or more other polymers whose surface is roughened so as to produce a matte surface.

16. The laminate film of claim 8, wherein said non-sealable, winding layer is treated to provide a surface for lamination or coating with adhesives and/or inks.

17. The laminate film of claim 1, wherein said crystalline polyethylene wax has a molecular weight of 400–3000, a melting point of 80–132° C. by ASTM D127, viscosity at 149° C. of 2–170 centipoise by ASTM D3236 or viscosity at 99° C. of 40–60 SSU by ASTM D88, needle penetration at 25° C. of 15–0.0 dmm by ASTM D1321, and density at 25° C. of 0.92 –0.99 by ASTM D1298.

18. The laminate film of claim 1, wherein said ethylene copolymer wax has a molecular weight of 500–3000, a melting point of 90–120° C. by ASTM D127, viscosity at 99° C. of 58–120 SSU by ASTM D 88, needle penetration at 25° C. of 13.0–2.0 dmm by ASTM 1321 and average branches per molecule of 0.5–4.0.

19. The laminate film of claim 1, wherein said hydroxyl-terminated polyethylene wax has a molecular weight of 375–700, a melting point of 78–105° C. by ASTM D127, a viscosity at 149° C. of 2.0–10.0 centipoise by ASTM D3236, needle penetration at 25° C. of 10.0–1.5 dmm by ASTM 1321, density at 25° C. of 0.95–0.96 by ASTM D792, and hydroxyl number of 127–65 mg KOH/g by ASTM D222.

20. The laminate film of claim 1, wherein said carboxyl-terminated polyethylene wax has a molecular weight of 390–715, a melting point of 89–110° C. by ASTM D127, viscosity at 149° C. of 5.0–17.0 centipoise by ASTM D3236, needle penetration at 25° C. of 9–1.5 dmm by ASTM 1321, and acid number of 115–63 mg KOH/g by BWM 3.01A.

21. The laminate film of claim 1, wherein said metal layer is vapor deposited.

22. The laminate film of claim 1, wherein said metal layer has a thickness of 5 to 70 nm.

23. The laminate film of claim 1, wherein said metal layer comprises a metal selected from the group consisting of titanium, vanadium, chromium, maganese, iron, cobalt, nickel, copper, zinc, aluminum, gold, and palladium.

24. The laminate film of claim 1, wherein said metal layer comprises aluminum.

25. The laminate film of claim 1, wherein said polymer core layer comprises a polypropylene resin.

* * * * *